(12) United States Patent
Matsen et al.

(10) Patent No.: US 6,884,975 B2
(45) Date of Patent: Apr. 26, 2005

(54) LOCALIZED STRESS RELIEF BY INDUCTION HEATING

(75) Inventors: Marc R. Matsen, Seattle, WA (US); Terry L. Smith, Renton, WA (US)

(73) Assignee: The Boeing Company, Chicago, IL (US)

( * ) Notice: Subject to any disclaimer, the term of this patent is extended or adjusted under 35 U.S.C. 154(b) by 162 days.

(21) Appl. No.: 10/292,038

(22) Filed: Nov. 12, 2002

(65) Prior Publication Data

US 2004/0089655 A1 May 13, 2004

(51) Int. Cl.[7] .................................................. H05B 6/40
(52) U.S. Cl. ..................... 219/615; 219/634; 219/651; 219/670; 219/675; 148/567; 266/129
(58) Field of Search .................................. 219/602, 615, 219/617, 634, 633, 651, 647, 670, 672–677; 148/567; 266/129

(56) References Cited

U.S. PATENT DOCUMENTS

| | | | | |
|---|---|---|---|---|
| 2,805,316 A | * | 9/1957 | Chapman | 219/72 |
| 3,609,277 A | * | 9/1971 | Dallet et al. | 219/615 |
| 3,754,109 A | * | 8/1973 | Moulin et al. | 219/615 |
| 4,694,131 A | * | 9/1987 | Ino et al. | 219/611 |
| 5,645,744 A | | 7/1997 | Matsen et al. | |
| 5,728,309 A | | 3/1998 | Matsen et al. | |
| 6,166,359 A | * | 12/2000 | Cruickshank | 219/607 |

* cited by examiner

*Primary Examiner*—Philip H. Leung
(74) *Attorney, Agent, or Firm*—Harness Dickey & Pierce P.L.C.

(57) ABSTRACT

A system and method inductively heats and stress relieves a weld joint area having a stress induced zone. A susceptor assembly is positioned over the stress induced zone. The susceptor assembly includes susceptor sheets manufactured to operate at different, preselected Curie temperatures. A housing is mounted over the susceptor assembly including an induction coil positioned adjacent to the susceptor assembly. An alternating electric current is applied to the induction coil. The alternating electric current causes the induction coil to generate a plurality of magnetic flux lines. The invention provides the advantage that the magnetic flux lines passing through the susceptor assembly heat the susceptor assembly providing localized and controlled temperature heat to the weld joint area to stress relieve the stress induced zone.

16 Claims, 6 Drawing Sheets

LOCALIZED STRESS RELIEF BY INDUCTION HEATING

FIELD OF THE INVENTION

The present invention relates in general to induction heating and more specifically to systems and methods to use induction heating for post weld stress relief of welded parts.

BACKGROUND OF THE INVENTION

Following a welding procedure, many metals exhibit increased residual stresses in the area adjacent to the weld zone. A weld zone is defined herein as a weld joint and the adjacent area surrounding the weld joint in a metal, wherein the material properties of the metal are affected by residual stresses following the weld procedure. This residual stress can be modeled using an exemplary finite element model to identify the value of the stress and therefore identify the amount of post-weld heat required to relieve the stress in the area of the weld zone. Computational models therefore exist to identify a temperature gradient required adjacent to the weld zone to relieve the residual stress in the material.

If the residual stress remaining in the material following welding is not relieved by a post-weld stress relief procedure, the fatigue life of the material can be degraded. A post-weld stress relief procedure is therefore normally performed on many materials in order to regain a full or nearly full fatigue life cycle for the material. Post-weld stress relief procedures known in the art include providing resistive heating coils on or adjacent to the material where the weld joint or weld joints are formed. The resistive heating coils are placed in direct contact with the welded material, therefore the welded material is raised in temperature to permit the residual stress to relax in the material.

The disadvantage of known post-weld stress relief procedures using the resistive heating method is that the resistive heaters are bulky and the temperature gradient required to minimize the amount of heat input to the metal part is difficult to obtain. If the temperature gradient which is precalculated for the particular material and material size is not closely followed, overheating of the material can occur which can distort and damage the material. Under-heating of the material can also occur which will prevent effective reduction of the residual stress. It is also desirable to provide the highest post-weld stress relief temperature adjacent to the weld area, decrease the temperature as the distance from the weld area increases, and isolate surrounding structure from the elevated temperature. Resistive heating coils known in the art are inefficient at providing this gradual change of temperature away from the weld zone and at isolating surrounding structure.

It is therefore desirable to provide a post-weld stress relief method and system which avoids the drawbacks of the known resistive heating coil methods. It is further desirable to provide a system and method of accurately controlling the temperature gradient at and adjacent to a weld zone for post-weld stress relief.

SUMMARY OF THE INVENTION

According to a preferred embodiment of the present invention, an apparatus is provided to heat and stress relieve a metal plate area. A susceptor assembly is constructed using one or more sheets of material having preselected Curie temperatures. The Curie temperature is defined as the sheet temperature at which magnetic permeability equals unity.

The individual susceptor sheets are assembled into a semi-flexible assembly by welding the individual sheets at their adjoining edges, forming pairs of sheets. The susceptor assembly is positioned over a metal plate in the area adjacent to a weld joint in the associated weld zone area. The susceptor assembly is sized to approximate the area where stress relief of the weld zone is required. A housing is then mounted over the susceptor assembly covering the susceptor assembly and a portion of the metal plate area. An induction coil is positioned within the housing adjacent to the susceptor assembly. An oscillating electric current is passed through the induction coil which induces an electromagnetic flux. This flux then couples with the susceptor assembly. The susceptor assembly has high magnetic permeability, which makes the susceptor assembly the lowest energy path for the electromagnetic flux to reside. Coupling the electromagnetic flux in the susceptor assembly causes an induced current flow with associated resistive losses (heating). Heat generated by this process conductively and convectively passes from the susceptor assembly to the weld zone of the metal plate area. The susceptor assembly, based on its multi-sheet design, allows a thermal gradient of temperatures to be applied to the metal plate area at the weld zone.

The susceptor assembly is constructed using sheets of material containing a combination of cobalt, nickel, and iron material. Higher concentrations of cobalt produce a higher Curie point for the susceptor material. The magnetic flux coupled through the susceptor material causes a rapid heat-up of the susceptor material up to the Curie point of each sheet at which point the susceptor material becomes an inefficient conduit for the magnetic flux since the material above its Curie point becomes non-magnetic. By varying materials in the susceptor sheet and using a plurality of individual sheets having different Curie temperatures, a susceptor assembly is formed which allows a temperature gradient to be induced into the plate material surrounding a weld joint. The development of susceptor sheet material is disclosed in U.S. Pat. No. 5,728,309 issued to Matsen, et al. which is incorporated herein by reference.

The housing which surrounds the susceptor assembly contains the induction coil which is held in place using an insulation material which in a preferred embodiment is formed from a castable ceramic material. The insulation (e.g., the ceramic material) spaces the induction coil away from both the susceptor assembly and from the housing walls. A coolant such as water is induced to flow through the tubular body sections of the induction coil to remove residual heat generated by the current flow through the induction coil. An alternating electric current flows through the induction coil to generate the lines of magnetic flux. In a preferred embodiment, the housing is held in place adjacent to the weld zone by a vacuum sheet which is a flexible material applied over the perimeter of the housing and about a small surface area of the metal plate. A vacuum seal is formed at the contact points between the vacuum sheet material and the metal plate and a partial vacuum is drawn to hold the housing and the susceptor sheet against the metal plate.

A ferritic material in the form of a ferritic plate is also cut and formed to fit on a perimeter of the susceptor assembly. The ferritic material is selected from a non-electrically conductive material also having high magnetic permeability. The ferritic material captures and induces the lines of magnetic flux from a perimeter of the susceptor sheets and directs the lines of magnetic flux toward the weld joint located approximately at the center of the susceptor assembly. The ferritic plates act as both a concentrator and as an insulator to prevent the lines of magnetic flux from heating the surrounding area outside of the susceptor assembly therefore containing heat output from the susceptor assembly in the immediate area of the weld zone.

The alternating current is induced to flow in the induction coil and the susceptor assembly heats up to the Curie temperature of each associated sheet of the susceptor assembly. Although the lines of magnetic flux are continuously generated during the procedure, once the Curie temperature is reached for each of the sheet materials of the susceptor assembly, the temperature of the individual sheets is maintained at a constant level. This acts as an automatic temperature control which follows a predetermined temperature gradient calculated for the particular material the post-weld stress relief is being performed on.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
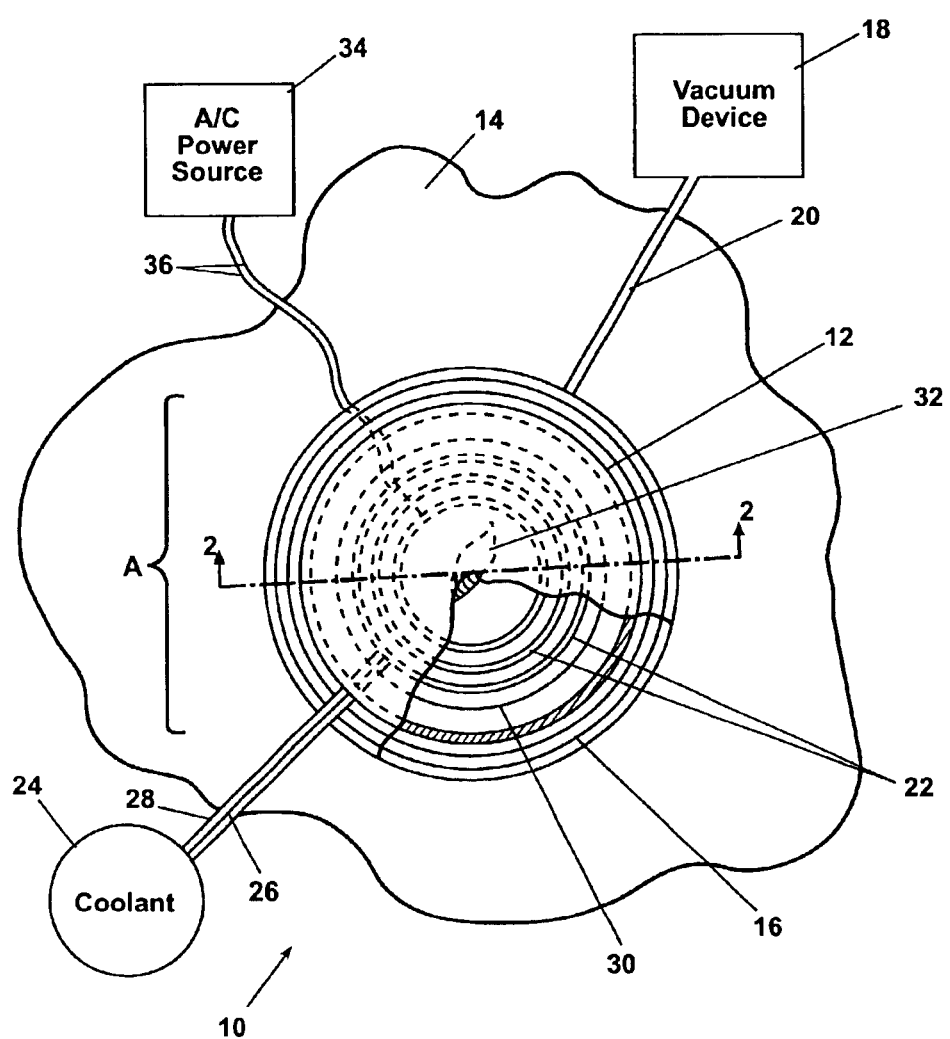
FIG. 1 is a plan diagram showing a preferred embodiment of an induction heating tool of the present invention located adjacent to a repair weld.

Referring to FIG. 1, an induction heating system 10 according to a preferred embodiment of the present invention is shown. The induction heating system 10 includes a tool body 12 which is temporarily affixed to a weld surface 14. The tool body 12 is held in place on the weld surface 14 at a vacuum seal 16. A vacuum device 18 draws a partial vacuum within the vacuum seal 16 through a vacuum tube 20. A geometrically arranged induction coil 22 is disposed within the tool body 12. A supply of coolant 24 is provided to cool the induction coil 22. The coolant 24 flows within the generally tubular shaped induction coil 22 as will be further described in reference to FIG. 3. The coolant 24 is provided via a coolant supply pipe 26 and returns after cooling the induction coil 22 via a coolant return pipe 28.

A susceptor assembly 30 is disposed between the induction coil 22 and the weld surface 14. The susceptor assembly 30 is generally centered over a weld joint 32 which is formed in the weld surface 14. The susceptor assembly 30 is shown having a generally circular shape, however, a variety of shapes (e.g., oval, rectangular, square, etc.) can be used which provide the necessary dimensions to cover the weld joint 32. An alternating current (A/C) power source 34 is shown connected to the induction coil 22 via a set of power lines 36. The vacuum seal 16, the induction coil 22, and the susceptor assembly 30 are shown in a partial sectioned view within FIG. 1 for clarity.

Figure 2:
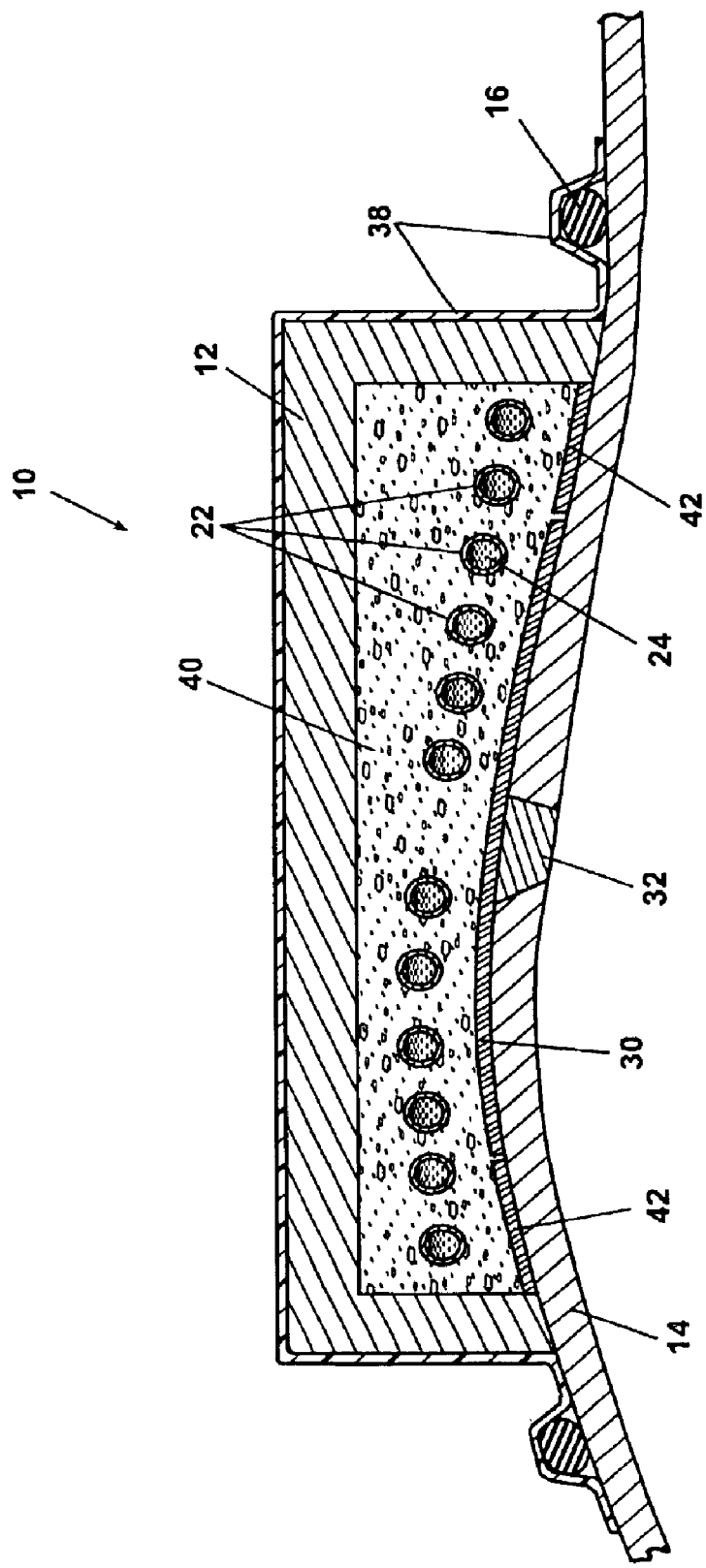
FIG. 2 is a cross-sectional view taken along section line 2—2 of FIG. 1 showing an assembly of components for a preferred embodiment of the present invention.

Referring to FIG. 2, the susceptor assembly 30 is flexible allowing it to be formed along the contoured outer surface of the weld surface 14. The induction coil 22 is spaced adjacent to and separated from the susceptor assembly 30. The vacuum seal 16 is shown as a ring. The vacuum seal 16 is formed preferably from a tacky, flexible material such as a clay known in the art, or any other suitable sealing material or compound. The advantage of using the flexible vacuum seal 16 is that the material will adhere temporarily to the weld surface 14 but when removed after the stress relief process, will not leave a residue on the contacted surface of the weld surface 14. The tool body 12 is preferably formed of a semi-rigid material capable of being modified to suit the geometry of the weld surface 14. The material of the tool body 12 is dielectric, such that the material is non-magnetic and will not alter or absorb the lines of magnetic flux generated by the induction coil 22. In a preferred embodiment, the material of the tool body 12 is a polymeric material, including polyvinyl chloride. In the embodiment shown in FIG. 2, the tool body 12 is represented as a partial section of a pipe or tube having a circular body and an end cap or cover.

To hold the tool body 12 in physical contact with the weld surface 14, a vacuum sheet 38 is disposed about the perimeter of the tool body 12 and about the vacuum seal 16. A partial vacuum drawn using the vacuum device 18 (shown in FIG. 1) collapses the vacuum sheet 38 about both the tool body 12 and the vacuum seal 16 thus pressing the tool body 12 against the weld surface 14 during the time that the susceptor assembly 30 is in use. An insulation material 40 is disposed within the tool body 12 and surrounds each segment of the induction coil 22 to retain a spacing between the induction coil 22 and the susceptor assembly 30. In a preferred embodiment, the spacing between the induction coil 22 and the susceptor assembly 30 is maintained between approximately 0.4 to 0.5 inches (1.01 to 1.27 cm). This spacing prevents physical contact between the induction coil 22 and the susceptor assembly 30. The spacing can be varied from the value given depending upon a variety of conditions including the spacing and size of the induction coil 22, the geometry of the weld surface 14, the amperage of the current flowing through the induction coil 22, and the desired temperature profile generated by the susceptor assembly 30. In a preferred embodiment, the composition of the insulation material 40 is a castable fused silica ceramic, but other suitable insulating materials may also be used.

Ferrite plates 42 are disposed about a perimeter of the susceptor assembly 30. The ferrite plates 42 are formed of a cintered magnetic material which is essentially electrically non-conductive. The material for the ferrite plates 42 is selected such that a high magnetic permeability allows it to absorb magnetic energy generated as lines of electromagnetic flux from the induction coil 22. The ferrite plates 42 also form an additional thermal barrier between the weld surface 14, the tool body 12 and the induction coil 22. This thermal insulation property helps to limit the heat input into the weld surface 14. The ferrite plates 42 are shown surrounding a perimeter of the susceptor assembly 30 and generally abut the perimeter of the susceptor assembly 30.

Figure 3:
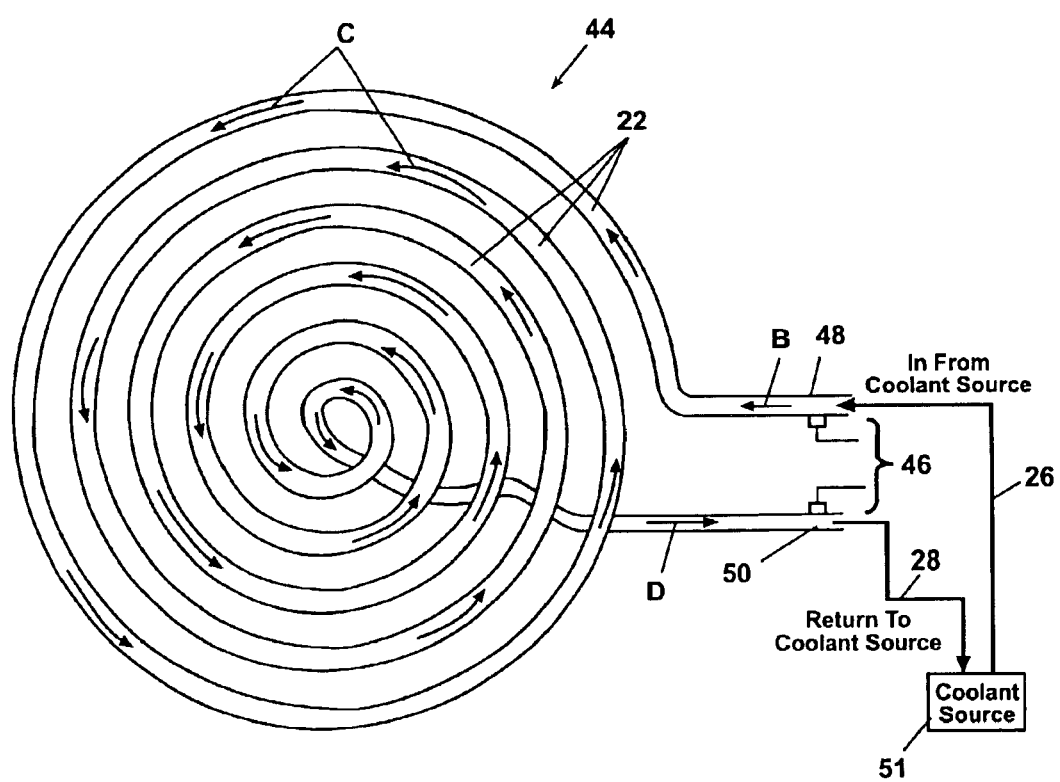
FIG. 3 is a plan view of an exemplary induction coil of a preferred embodiment of the present invention.

Referring now to FIG. 3, an exemplary induction coil assembly 44 is shown. The induction coil assembly 44 includes a plurality of segments of the induction coil 22 preferably formed as shown in a helical arrangement. The induction coil 22 preferably comprises a copper tube internally carrying the coolant 24 (shown in FIG. 2). A current bus 46 connects the induction coil assembly 44 to the power lines 36 (shown in FIG. 1). The current bus 46 feeds a current supply tubing section 48 and completes the circuit via a current return tubing section 50. Alternating electric current enters the induction coil assembly 44 via the current supply tubing section (i.e., conductor) 48 in a current supply direction B as shown. Current flow through the induction coil 22 is generally along the perimeter of the induction coil 22 tubular body in a coil current flow path direction C as shown. The current flow exits the induction coil assembly 44 via the current return tubing section (i.e., conductor) 50 in a current return direction D. The coolant 24 flowing within the induction coil 22 is supplied from a coolant source 51 via the coolant supply pipe 26 and returns from cooling the induction coil 22 via the coolant return pipe 28. The direction of coolant flow can be in parallel with the coil current flow path direction C or in a counter-current flow direction (not shown).

The helical design of the induction coil assembly 44 shown is an exemplary preferred embodiment of the present invention. The induction coil 22 can be formed in any geometric pattern which is suited to provide coverage above a susceptor assembly 30 (shown in FIG. 1). It is also noted that the approximately even spacing shown in FIG. 3 between segments of the induction coil 22 is also an exemplary preferred arrangement. The spacing between the individual segments of the induction coil 22 can vary from that shown in FIG. 3 depending upon the geometry of the tool body 12 and the susceptor assembly 30.

Figure 4:
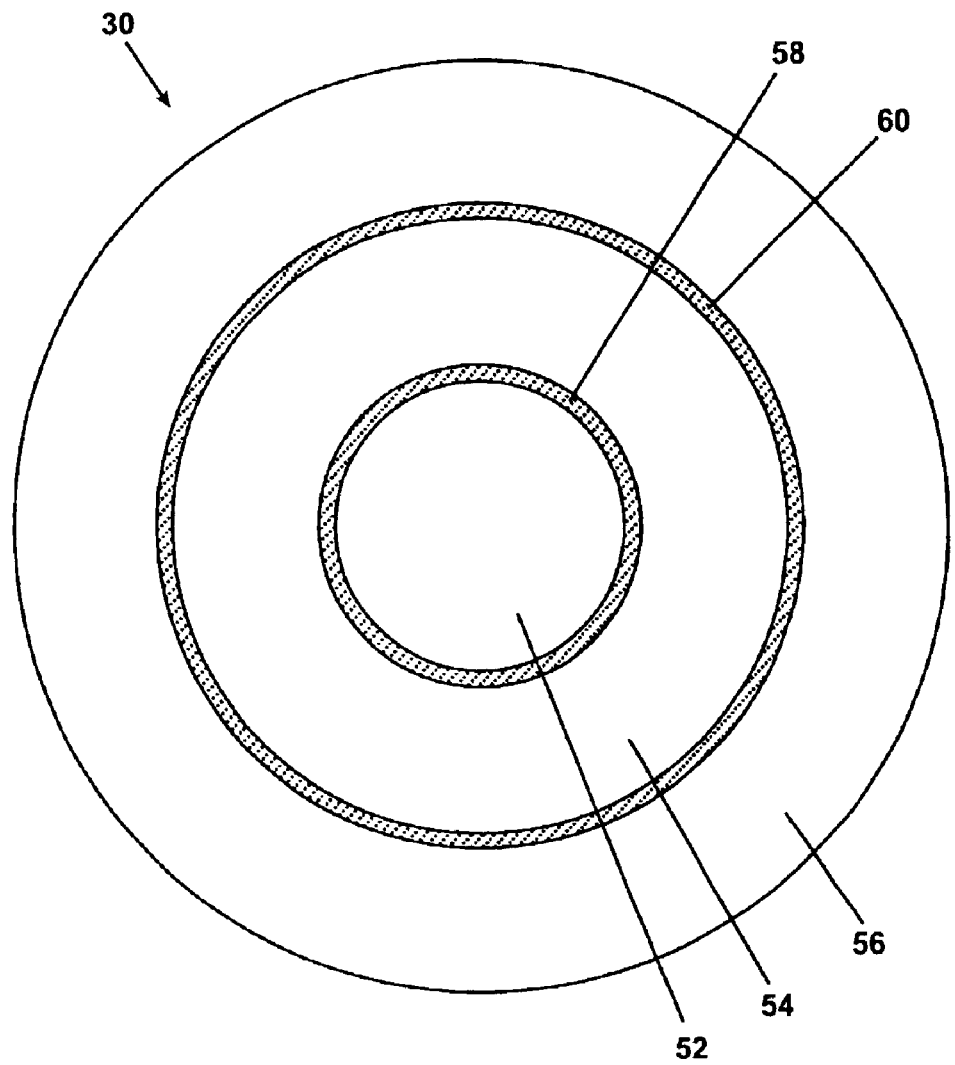
FIG. 4 is a plan view of an exemplary susceptor assembly of the present invention having a circular form having individual sheets joined by welding.

Referring to FIG. 4, an exemplary susceptor assembly 30 of a preferred embodiment of the present invention is shown. The susceptor assembly 30 includes a first susceptor sheet 52 enclosed within a second susceptor sheet 54 which in turn is enclosed within a third susceptor sheet 56. The first susceptor sheet 52, the second susceptor sheet 54, and the third susceptor sheet 56 form adjacent pairs of susceptor sheets. Each of the adjacent pairs of susceptor sheets are joined by a weld joint. Other processes can be used to join susceptor sheets which meet or exceed the operating temperature range of the susceptor assembly. In the exemplary embodiment shown in FIG. 4, a weld joint 58 joins the first susceptor sheet 52 to the second susceptor sheet 54 and a weld joint 60 joins the second susceptor sheet 54 to the third susceptor sheet 56. By using multiple sheets to form the susceptor assembly 30, a variety of Curie temperatures can be used to develop a susceptor assembly. In the exemplary embodiment shown in FIG. 4, the first susceptor sheet 52 can be selected to have the highest Curie temperature of the three sheets shown. The highest Curie temperature sheet is then positioned adjacent to the weld joint (e.g., weld joint 32 shown in FIG. 1). Each adjacent sheet in the susceptor assembly can then be formed using a successively lower Curie temperature such that a desired temperature gradient is formed in the weld surface 14 (shown in FIG. 1). It will be appreciated that any combination of Curie temperatures can be used for a susceptor assembly. In a preferred embodiment, however, each sheet of a multi-sheet susceptor assembly has a progressively reducing Curie temperature starting at the susceptor sheet adjacent to a weld joint. The susceptor assembly 30 shown in FIG. 4 has an exemplary circular shape. As noted above for the induction coil assembly 44 (shown in FIG. 3), any geometric shape can be used for the susceptor assembly 30 including having sheet segments which have different widths or cross sections from sheet to sheet or within each sheet such that a temperature gradient can be varied dependent upon the geometry of the weld surface.

Figure 5:
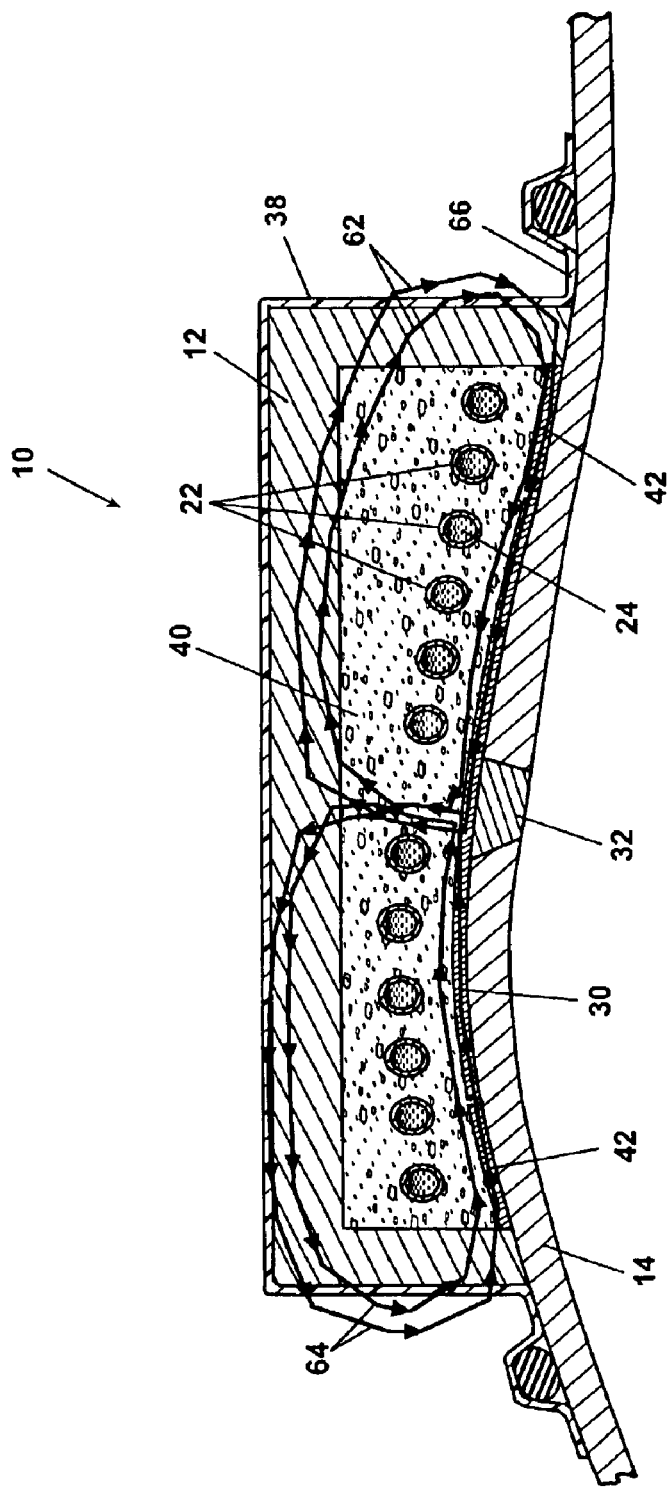
FIG. 5 is a cross-sectional view similar to that of FIG. 2 further showing the lines of magnetic flux generated by the induction coil.

Referring to FIG. 5, the sectioned elevation view of FIG. 2 further shows an operating condition for the induction heating system 10 of the present invention. Magnetic flux lines are shown which are generated by the induction coil 22 with an alternating electric current passing through them. For clarity, a clockwise magnetic flux line group 62 is shown and a counter-clockwise magnetic flux line group 64 is similarly shown. Each of the clockwise magnetic flux line group 62 and the counter-clockwise magnetic flux line group 64 emanate away from the induction coil 22. Both the ferrite plates 42 and the susceptor assembly 30 are high magnetic permeability materials, therefore the lines of magnetic flux are concentrated by the ferrite plates 42 and enter at the outside perimeter areas of the susceptor assembly 30 where they converge adjacent to the weld joint 32. The clockwise magnetic flux line group 62 and the counter-clockwise magnetic flux line group 64 excite electrons in the susceptor assembly 30 which generates heat within the susceptor assembly 30. This heat is conveyed primarily conductively from the susceptor assembly 30 to the weld surface 14. The amount of heat generated by the susceptor assembly 30 varies between each of the susceptor sheets of the susceptor assembly 30.

As shown in FIG. 5, the induction coil 22 extends beyond a perimeter of the susceptor assembly 30. It is desirable to extend the induction coil 22 to prevent a drop off of flux density on the perimeter of the susceptor assembly 30. The ferrite plates 42 both collect the lines of magnetic flux and act as a thermal barrier between the weld surface 14 and the induction coil 22 such that the outwardly extending induction coil 22 transmits minimum quantities of heat into the weld surface 14.

The insulation material 40 is selected from a group of materials which exhibit a very low coefficient of thermal expansion. A low thermal expansion coefficient is necessary for the insulation material 40 due to the high thermal gradient generated between the weld surface 14 adjacent to the susceptor assembly 30 and the tool body 12. The insulation material 40 prevents excessively high temperatures from reaching the tool body 12, the vacuum sheet 38, or the vacuum seal 16 which could cause these materials to reach or exceed their melting points. Temperatures of approximately 1400° F. (760° C.) and higher are common in a stress relief procedure. The Curie temperature of cobalt-iron-nickel alloys used to produce the susceptor assembly herein can range from approximately 675° F. to approximately 2050° F. (355° C. to 1120° C.). These temperatures are sufficient to exceed the melting points of the tool body 12, the vacuum sheet 38, or the vacuum seal 16. It is desirable to maintain these materials at or near ambient temperature.

Referring back to FIG. 1, the A/C power source 34 provides alternating current to the induction coil 22. A frequency of preferably approximately 3 KHz is used as a base frequency to operate the induction heating system 10. The current and voltage used will vary depending upon variables of each application of the present invention. The voltage and current are also subject to the size of the induction coil assembly 44 (shown in FIG. 3). In a preferred embodiment of the present invention, water is used as the coolant 24. The type of coolant 24 that is used can vary depending upon the availability of coolant and the ability to both pump and remove heat from the coolant. In a preferred embodiment, the vacuum device 18 is a vacuum pump. Other means to hold the tool body 12 in contact with the weld surface 14 can be used, including mechanical means or weights attached to the tool body 12.

Figure 6:
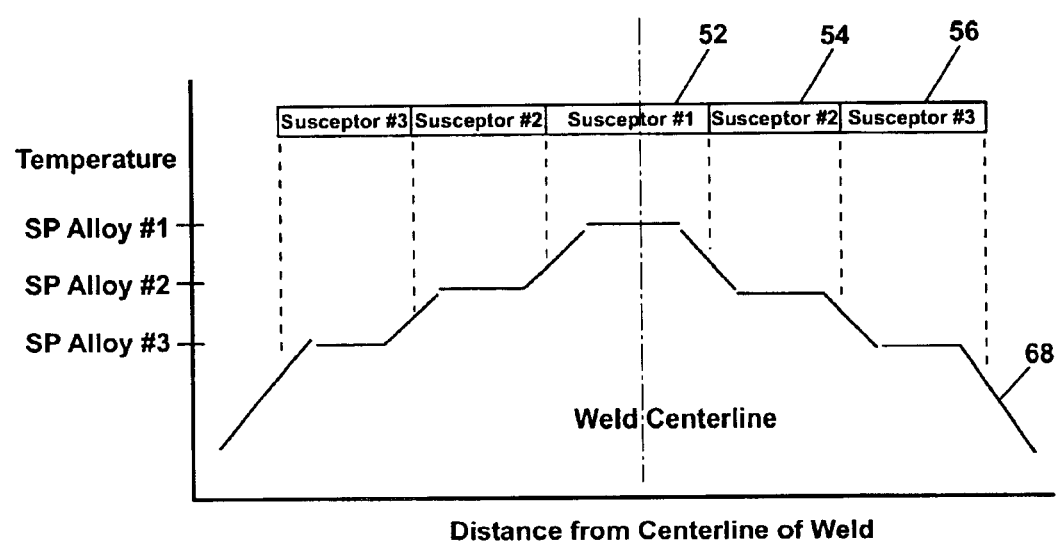
FIG. 6 is a graph showing an exemplary distribution of temperatures about a centerline of a weld joint using the circular susceptor assembly of the present invention.

Referring to FIG. 6, a thermal gradient for the 3-sheet design susceptor assembly 30 shown in FIG. 3 is graphed relative to both the type of alloy material used in the susceptor sheets and the temperature versus distance from a weld centerline. In the preferred embodiment shown, the first susceptor sheet 52 has the highest Curie temperature, followed by the second susceptor sheet 54 and finally by the third susceptor sheet 56. By varying the alloys used in each of the susceptor sheets, a thermal profile 68 can be generated as shown. The thermal profile 68 is one of a plurality of exemplary thermal profiles that are available depending upon the geometry of the susceptor assembly designed for the application.

Referring back to FIG. 5, an outer ring 66 of the vacuum sheet 38 is formed between the tool body 12 and the vacuum seal 16 when a partial vacuum is drawn within the vacuum sheet 38. The vacuum sheet 38 is a flexible polymeric material known in the art. Connection between the vacuum tube 20 and the vacuum sheet 38 is formed by a standard fitting (not shown) also known in the art. Exemplary materials used for the vacuum sheet 38 include flexible polymeric materials capable of reaching temperatures up to approximately 250° F. (121° C.).

The induction heating system 10 of the present invention can be used for an extended period of time to provide post-weld stress relief or annealing required following a welding operation on a metal surface. The advantage of using the susceptor assembly of the present invention is that the temperature reached by each sheet of a multi-sheet susceptor assembly is maintained at a constant temperature due to the change in magnetic property upon reaching the Curie temperature. An extended "soak period" can be used to reduce the resultant thermal stresses in the welded material. Upon reaching the end of the stress relief period, the partial vacuum is released and the tool body 12 is removed from the weld surface 14. It is desirable that none of the materials used in the induction heating system 10 provide any residue which is left on the weld surface 14. This minimizes later clean-up of the weld surface following the use of the induction heating system 10 of the present invention.

The induction heating system 10 of the present invention offers several advantages. The use of a susceptor assembly permits a calculated thermal gradient to be accurately met. The temperature generated by the susceptor assembly can be carefully locally controlled in the immediate area of the weld surface. By providing cooling to the induction coil of the present invention, heat generated by the current flow through the induction coil does not damage the tool body 12 or the surrounding materials which hold the tool body 12 in position during the operation. The use of a coolant also reduces the overall operating temperature of the induction heating system 10 of the present invention. The induction heating system 10 of the present invention can be used for post-weld stress relief of metals including titanium which are particularly susceptible to post-weld stress retention. The induction heating system 10 of the present invention can be used on any metal following a welding process.

The description of the invention is merely exemplary in nature and, thus, variations that do not depart from the gist of the invention are intended to be within the scope of the invention. For example, the induction coil is described herein as a copper tube. Other forms for the induction coil can be used including cables and solid wire, providing cooling is provided adjacent to the induction coil. Other electrically conductive materials can also be used for the induction coil. The induction coil can comprise multiple assemblies in a tool body of the present invention if desired, providing proper spacing for the magnetic flux lines is provided. The susceptor assembly is described having 3 rings of sheet material. Arrangements having any number of sheet portions can be used. Such variations are not to be regarded as a departure from the spirit and scope of the invention.

What is claimed is:

1. An apparatus to heat and stress relieve an area of a metal work piece, comprising:
   a susceptor assembly positionable over said metal work piece, said susceptor assembly including a plurality of susceptor sheets each manufactured to operate at a different Curie temperature from an adjacent one of said susceptor sheets;
   a housing mountable over both said susceptor assembly and at least a portion of said metal work piece; and
   at least one induction coil positionable within said housing adjacent to said susceptor assembly;
   wherein an electric current passed through said induction coil projects a plurality of magnetic flux lines into said susceptor assembly to heat both said susceptor assembly and said portion of said metal work piece and operably induce a temperature gradient across said metal work piece.

2. The apparatus of claim 1, further comprising:
   said susceptor sheets being formed as a plurality of adjacent sheet pairs, each of said sheet pairs including:
   a first sheet; and
   a second sheet enclosing said first sheet, said second sheet having a Curie temperature lower than a Curie temperature of said first sheet; and
   said sheet pairs being each connected by a weld joint.

3. The apparatus of claim 2, further comprising:
   at least one ferrite plate selected from a non-electrically conductive, magnetic material; and
   said ferrite plate being positionable about a perimeter of said susceptor assembly to focus said plurality of magnetic flux lines into said susceptor assembly.

4. The apparatus of claim 2, further comprising a castable ceramic disposed in said housing to separate said susceptor assembly from said induction coil and to separate said induction coil from said housing.

5. The apparatus of claim 1, wherein further comprising:
   a flexible polymeric vacuum enclosure collapsible about said housing; and
   a perimeter of said housing, said vacuum enclosure being in contact with said perimeter and with said workpiece surrounding said perimeter when collapsed.

6. The apparatus of claim 5, further comprising:
   a vacuum source in communication with said vacuum enclosure; and
   said vacuum source operable to generate a partial vacuum within said vacuum enclosure to press said apparatus against said metal work piece.

7. The apparatus of claim 6, further comprising a releasable seal in contact with said metal work piece and surrounding said housing, said vacuum enclosure operably covering said releasable seal when said partial vacuum is created.

8. A system to inductively heat and stress relieve a weld joint area, said weld joint area including a stress induced zone, said system comprising:

a susceptor assembly positionable over at least said stress induced zone of said weld joint area, said susceptor assembly having a plurality of susceptor sheets each welded to at least an adjacent one of said sheets and each operable to function at a different Curie temperature;

a housing releasably mountable over said susceptor assembly;

an induction coil positionable within said housing adjacent to said susceptor assembly; and an alternating electric current connectable to said induction coil;

wherein said alternating electric current is operable to induce said induction coil to generate a plurality of magnetic flux lines, and said magnetic flux lines pass through said susceptor assembly to heat said susceptor assembly and said weld joint area, to stress relieve said stress induced zone.

9. The system of claim 8, wherein each said susceptor sheet is operable to induce a different temperature of said weld joint area contacted by each susceptor sheet, the plurality of susceptor sheets being operable to create a temperature gradient across said weld joint area .

10. The system of claim 9, further comprising an insulating material disposed in said housing at least between said susceptor assembly and said induction coil.

11. The system of claim 10, wherein said insulating material comprises a castable ceramic.

12. The system of claim 10, further comprising:

said induction coil formed as a hollow tube; and a coolant disposed within said hollow tube to remove heat generated by said induction coil.

13. The system of claim 8, wherein said housing comprises a dielectric material.

14. The system of claim 8, further comprising:

said induction coil being extendably disposed beyond a perimeter of said susceptor assembly;

said induction coil being formed as a continuous coil segment having both a generally helical shape and a predetermined spacing between parallel portions of said continuous coil segment; and said magnetic flux lines generated by said induction coil being at least partially absorbed by a ferrite plate disposed beyond a perimeter of said susceptor assembly such that said magnetic flux lines induce heating generally within said perimeter of said susceptor assembly.

15. An apparatus to heat and stress relieve an area of a metal work piece, comprising:

a susceptor assembly positionable over said metal work piece, said susceptor assembly including a plurality of susceptor sheets each manufactured to operate at a preselected Curie temperature;

a housing mountable over both said susceptor assembly and at least a portion of said metal work piece;

at least one induction coil positionable within said housing adjacent to said susceptor assembly;

said susceptor sheets being formed as a plurality of adjacent sheet pairs;

said sheet pairs being each connected by a weld joint;

at least one ferrite plate selected from a non-electrically conductive, magnetic material; and said ferrite plate being positionable about a perimeter of said susceptor assembly to focus said plurality of magnetic flux lines into said susceptor assembly;

wherein an electric current passed through said induction coil projects a plurality of magnetic flux lines into said susceptor assembly to heat both said susceptor assembly and said portion of said metal work piece.

16. A system to inductively heat and stress relieve a weld joint area, said weld joint area including a stress induced zone, said system comprising:

a susceptor assembly positionable over at least said stress induced zone of said weld joint area, said susceptor assembly having a plurality of susceptor sheets each manufactured to operate at a preselected Curie temperature;

a housing releasably mountable over said susceptor assembly;

an induction coil positionable within said housing adjacent to said susceptor assembly;

an alternating electric current connectable to said induction coil;

said induction coil being extendably disposed beyond a perimeter of said susceptor assembly;

said induction coil being formed as a continuous coil segment having both a generally helical shape and a predetermined spacing between parallel portions of said continuous coil segment; and said magnetic flux lines generated by said induction coil being at least partially absorbed by a ferrite plate disposed beyond a perimeter of said susceptor assembly such that said magnetic flux lines induce heating generally within said perimeter of said susceptor assembly;

wherein said alternating electric current is operable to induce said induction coil to generate a plurality of magnetic flux lines, and said magnetic flux lines pass through said susceptor assembly to heat said susceptor assembly and said weld joint area, to stress relieve said stress induced zone.

* * * * *